US009521235B2

(12) United States Patent
Park

(10) Patent No.: US 9,521,235 B2
(45) Date of Patent: Dec. 13, 2016

(54) TWO-WAY MIRRORING SYSTEM FOR SOUND DATA

(71) Applicants: HYUNDAI MOTOR COMPANY, Seoul (KR); Kia Motors Corporation, Seoul (KR)

(72) Inventor: Sung Woo Park, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 14/554,922

(22) Filed: Nov. 26, 2014

(65) Prior Publication Data

US 2016/0057271 A1 Feb. 25, 2016

(30) Foreign Application Priority Data

Aug. 25, 2014 (KR) .................. 10-2014-0110939

(51) Int. Cl.
*H04B 1/3822* (2015.01)
*H04M 1/725* (2006.01)

(52) U.S. Cl.
CPC ..... *H04M 1/72527* (2013.01); *H04M 1/72558* (2013.01)

(58) Field of Classification Search
CPC ...... H04B 1/3822; H04B 1/3877; H04M 1/00; H04M 1/6033; H04M 1/6075
USPC .................. 455/563, 569.1, 569.2
See application file for complete search history.

(56) References Cited

U.S. PATENT DOCUMENTS

| 9,172,784 B2 * | 10/2015 | Grost .................. H04M 1/6091 |
| 9,225,376 B2 * | 12/2015 | Olson .................. H04B 1/3877 |
| 2009/0024943 A1 | 1/2009 | Adler et al. |
| 2013/0196646 A1 | 8/2013 | Oh et al. |
| 2013/0297835 A1 | 11/2013 | Cho |
| 2015/0043745 A1 * | 2/2015 | Juzswik .................. H04B 1/00 381/86 |

FOREIGN PATENT DOCUMENTS

| JP | H11-297055 A | 10/1999 |
| JP | 2004-086029 A | 3/2004 |
| JP | 2014-130566 A | 7/2014 |
| KR | 2010-0063012 A | 6/2010 |
| KR | 2013-0086756 A | 8/2013 |
| KR | 2013-0123173 A | 11/2013 |

* cited by examiner

*Primary Examiner* — Blane Jackson
(74) *Attorney, Agent, or Firm* — McDermott Will & Emery LLP

(57) ABSTRACT

A two-way mirroring system for sound data comprises a display device configured to output data including video or sound through a display; and a source device configured to be connected with the display device and output the data to the display device. The display device includes an audio transmission server which encodes the sound received from a sound input device receiving the sound and transmits it to the source device, and the source device includes an audio transmission client which receives the encoded sound transmitted from the audio transmission server and transmits the received, encoded sound to an application provided in its inside.

5 Claims, 4 Drawing Sheets

TWO-WAY MIRRORING SYSTEM FOR SOUND DATA

CROSS-REFERENCE TO RELATED APPLICATION

This application is based on and claims the benefit of priority to Korean Patent Application No. 10-2014-0110939, filed on Aug. 25, 2014 in the Korean Intellectual Property Office, the disclosure of which is incorporated herein in its entirety by reference.

TECHNICAL FIELD

The present disclosure relates to a two-way mirroring system for sound data, and more particularly, a two-way mirroring system for providing a two-way communication for sound data through a mirror link wired connection without a Bluetooth channel connection.

BACKGROUND

As various multimedia services such as digital TV, IPTV (Internet Protocol Television), VOD (Video On Demand), etc. and the technology for enjoying the multimedia services are developed, among user devices capable of freely accessing multimedia contents such as digitized video, graphic, audio, etc., most of all, a growing need for a mobile terminal exists. To meet the growing need, recently, the technology of sharing data via wired or wireless communication, the display mirroring technology of sharing a screen image via the wired or wireless communication, etc. are adopted at user devices.

In order to perform the display mirroring, the smooth data transmission between remotely positioned user devices is required. Currently, the mirroring technology has unilateral directionality between the user devices depending on the type of the transmitted data. Concretely, if a head unit of a vehicle and a mobile terminal are mirrored, the data related to the touch or operation of the head unit is transmitted to the mobile terminal and the screen image data of the mobile terminal is transmitted to the head unit. And, the sound data of the mobile terminal is transmitted unilaterally to only the head unit. Therefore, if the mobile terminal and the head unit are mirrored, the connection of the mobile terminal and the head unit through a separate Bluetooth channel is needed in order to use the telephone call service or the voice recognition service of the mobile terminal. However, it's quite cumbersome to connect the mobile terminal and the head unit via the separate Bluetooth channel.

SUMMARY

The embodiment of the present inventive concept provides a two-way mirroring system for sound data capable of a two-way communication for sound data such as a telephone call or voice recognition service in a mirror link via wired connection without a connection of a Bluetooth communication.

A two-way mirroring system for sound data according to an embodiment of the present inventive concept comprises: an infotainment device configured to display or play data as a video or sound; and a source device configured to be connected with the infotainment device and transmit the data to the infotainment device, wherein the infotainment device includes an audio transmission server which encodes the sound received from a sound input device receiving the sound and transmits it to the source device, and the source device includes an audio transmission client which receives the encoded sound transmitted from the audio transmission server and transmits the received, encoded sound to an application provided in its inside the sound device.

In an embodiment, the source device is a mobile phone possessed by a passenger of the vehicle, the infotainment system and the mobile terminal are connected by a mirror link.

In an embodiment, the source device further comprises a communication device which receives and transmits a telephone call, and the application provided in the inside of the source device is a telephone call application which controls the communication device.

In an embodiment, the infotainment device and the source device are connected by a wired connection through USB (Universal Serial Bus).

In an embodiment, the source device comprises: a first data transmission server configured to output a control signal for controlling open and close of the sound input device provided in the display infotainment device to the display infotainment device; and a first data transmission client configured to receive a input end signal of the sound inputted from the display infotainment device to the sound input device, the display infotainment device further comprises: a second data transmission client configured to receive the control signal from the first data transmission server; and a second data transmission server configured to transmit the input end signal of the sound to the first data transmission client.

In an embodiment, the application provided in the inside of the source device is a voice recognition application recognizing the sound inputted to the sound input device.

A two-way mirroring system for sound data according to the present invention is capable of a two-way communication for sound data such as a telephone call or voice recognition service in a mirror link by a wired connection without a connection of a Bluetooth communication.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
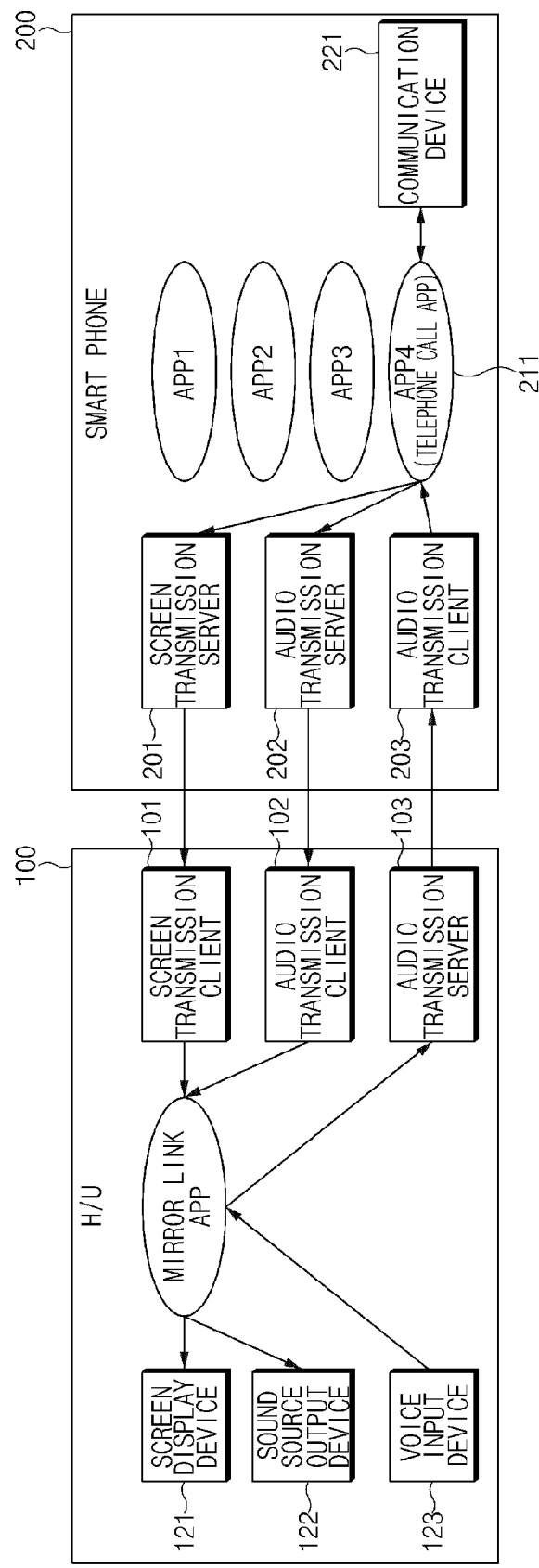
FIG. 1 is a diagram showing a telephone call of a two-way mirroring system for sound data according to an embodiment of the present inventive concept.

The advantage and features of the present inventive concept and how to achieve it will be explained through embodiments described in detail with the accompanying drawings. However, the inventive concept is not limited to embodiments described herein and may be embodied in other aspects. Only, the present embodiment is provided for explaining to those skilled in the art to which this invention pertains in detail to the extent that it is possible to easily embody the technical spirit of the present inventive concept.

In the drawings, embodiments of the present inventive concept are not limited to the shown specific aspects and are exaggerated in order to clarify. Although specific terms are used herein, it is only used for explaining the present inventive concept, and it is not used for limiting the meaning or the scope of the present inventive concept described in the claims.

The expression "and/or" herein is used as the meaning including at least one of components listed before and after the expression. Also, the expression "connected/coupled" is used as the meaning including being directly connected with another component or indirectly connected through another component. A singular form herein also includes a plural form unless it is specially referred in a phrase. Also, the components, steps, operations and elements referred as "comprise" or "comprising" used herein mean the presence or addition of at least one of other components, steps, operations and elements.

Hereinafter, with reference to the drawings an embodiment of the present inventive concept will be described in detail.

In a system for displaying and playing screen image and sound generated by a source device through a display device by connecting the display device and the source device via wired connection, the same screen image and sound of the source device are transmitted to the display device through a wired communication. And, a control signal inputted through an input provided in the display device is also transmitted to the source device through a wired communication. Through this, the source device can be controlled by the operation of the display device, and the controlled screen image and sound are displayed and played through the display device.

The specific example of the system is typically a mirror link system, and currently, the mirror link system is applied to an infotainment system provided in a vehicle and a mobile terminal possessed by a passenger of a vehicle. Here, a display device may be the infotainment system, and a source device may be the mobile terminal. That is, through the mirror link applied to the vehicle, various applications executed in the mobile terminal can be used through the infotainment system of which screen image is larger than that of the mobile terminal and sound volume is higher than that of the mobile terminal.

However, if the infotainment system of the vehicle and the mobile terminal are connected by the mirror link, the same screen image and sound displayed and played from the mobile terminal are just transmitted to the display device, the sound generated by the infotainment system is transmitted through only a separately connected Bluetooth communication. Concretely, when receiving a call or placing a call at the mobile terminal, the telephone call function is performed by bi-directionally transmitting and receiving voice data by a separate Bluetooth communication. The same bi-directional process is performed even when using the speech recognition service. After all, even if the display device and the source device are connected by a wired connection in the common mirror link system, in order to bi-directionally transmit and receive sound data, a separate Bluetooth connection is required. The separate Bluetooth connection, however, is cumbersome when using the mirror link, and results in a voice data recognition error and the like.

Because the present inventive concept bi-directionally communicates sound data through the already connected wired communication (for example, USB) without the connection of a separate Bluetooth communication, the telephone call or voice recognition application embedded in the infotainment system of a vehicle is not needed, which makes the driver or the user in a vehicle handy.

Hereinafter, a head unit is an example of the infotainment system provided in a vehicle, which also serves as a display device of a mirror link, a smartphone is an example of the mobile terminal possessed by the passenger of the vehicle, which also serves as a source device. However, it is not limited to these examples.

FIG. 1 is a diagram showing a telephone call of a two-way mirroring system for sound data according to an embodiment of the present inventive concept.

Referring to FIG. 1, a two-way mirroring system for sound data includes a head unit 100 and a smart phone 200, the head unit 100 and the smart phone 200 are connected by a wired connection. Here, the wired connection may be the connection using USE (Universal Serial Bus), but the wired connection is not limited thereto.

The smart phone 200 transmits the screen image and sound executed in an application (APP1, APP2, APP3, or APP4) to the head unit 100 of the vehicle having a larger screen image and a better speaker. The smart phone 200 includes a screen transmission server 201 and an audio transmission server 202. The screen transmission sever 201 and the audio transmission server 202 encodes the screen image or sound generated by the currently executed application (for example, APP1) and transmits it to the head unit 100 connected by a wired connection.

The head unit 100 receives the screen image or sound generated by the application (for example, APP1) executed in the smart phone 200 through a wired connected communication and transmits it to the outside through a screen display device 121 or a sound source output device.

For this, the head unit 100 includes a screen transmission client 101 receiving the screen image data transmitted from the screen transmission server 201 of the smart phone 200, and includes an audio transmission client 102 receiving the audio data transmitted from the audio (sound) transmission server 202 of the smart phone 200.

Here, the screen transmission client 101 and the audio transmission client 102 transmit the received screen image and audio data to a mirror link APP 111 for a mirror link, and the mirror link APP 111 displays and plays the received screen image and audio data to the screen display device 121 and the sound source output device 122. Here, the screen display device 121 may be a display having a display panel such as a touch screen, and the sound source output device 122 may be a sound device having a speaker provided in the inside of the vehicle.

As the above described, in the mirror link, the screen image and sound data are uni-directionally transmitted from the smart phone 200 which is a source device to the head unit 100. As a result, in a common mirror link system, if the application which is executed in the smart phone 200 is a telephone APP (APP4; 211) for a telephone call, the head unit and the smart phone have required a separate connection via a Bluetooth communication.

However, the head unit 100 of the two-way mirroring system for sound data includes the audio transmission server 103, and the smart phone 200 includes the audio transmission client 203. Accordingly, the two-way mirroring system for sound data can transmit the sound (or voice) inputted through the sound input device (for example, a voice input device 123) provided in the head unit 100 to smart phone 200. Concretely, the voice data inputted from the voice input device 123 is transmitted to the audio transmission server 103 through the mirror link APP ill, and the audio transmission server 103 encodes the transmitted voice data and transmits it to the audio transmission client 203 provided in the smart phone 200. That is, the two-way mirroring system for sound data can transmit the sound data from the smart phone 200 to the head unit 100, and can transmit the data from the head unit 100 to the smart phone 200.

After all, the two-way mirroring system for sound data according to the present inventive concept can use the telephone call function or voice recognition function of the mirror linked smart phone 200 through the head unit 100. The telephone call function and the voice recognition function will be described in detail with reference to the following FIG. 3 and FIG. 4.

Figure 2:
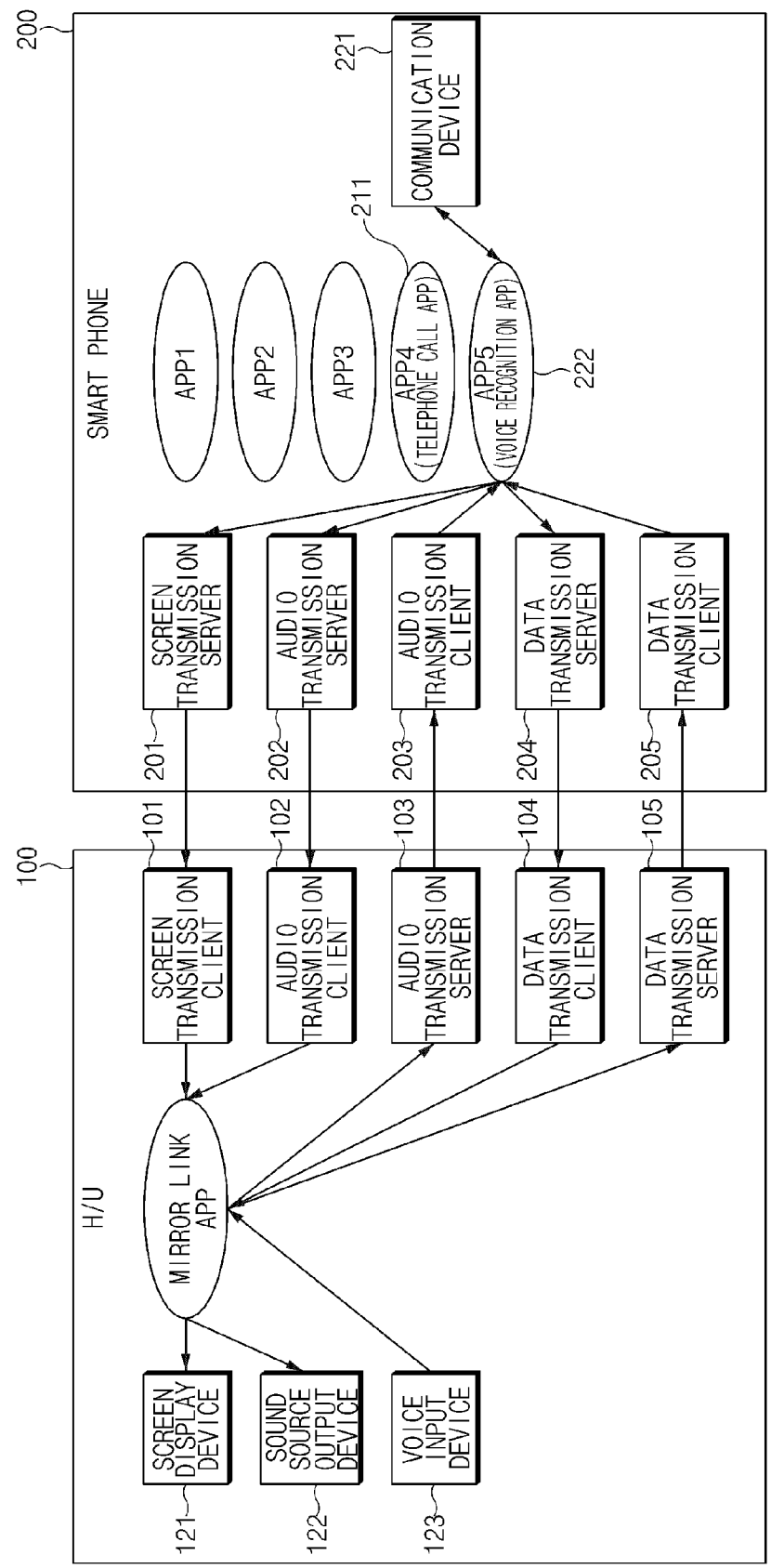
FIG. 2 is a diagram showing voice recognition of a two-way mirroring system for sound data according to an embodiment of the present inventive concept.

FIG. 2 is a diagram showing voice recognition of a two-way mirroring system for sound data according to an embodiment of the present inventive concept. Referring to FIG. 2, the two-way mirroring system for sound data of FIG. 2 further includes a data transmission client 104 and a data transmission server 105, and the smart phone 200 further includes a data transmission server 204 and a data transmission client 205, in comparison with FIG. 1.

In the voice recognition of a common mirror link, if the voice recognition application is executed in the smart phone 200, the voice input device for the voice recognition is to be a microphone provided in the smart phone 200. In this case, due to various sounds generated from the inside of the vehicle, the voice recognition error is increased, and the quality of the voice recognition service is degraded.

However, because the two-way mirroring system for sound data of FIG. 2 can control the open and close of the voice input device 123 provided in the head unit 100 in the smart phone 200 connected via wired connection, transmit the inputted sound to the smart phone 200 through the voice input device 123 provided in the head unit 100, and recognize the voice of the transmitted sound, based on the above additionally included components 104, 105, 204, 205, the voice can be more accurately recognized.

Figure 3:
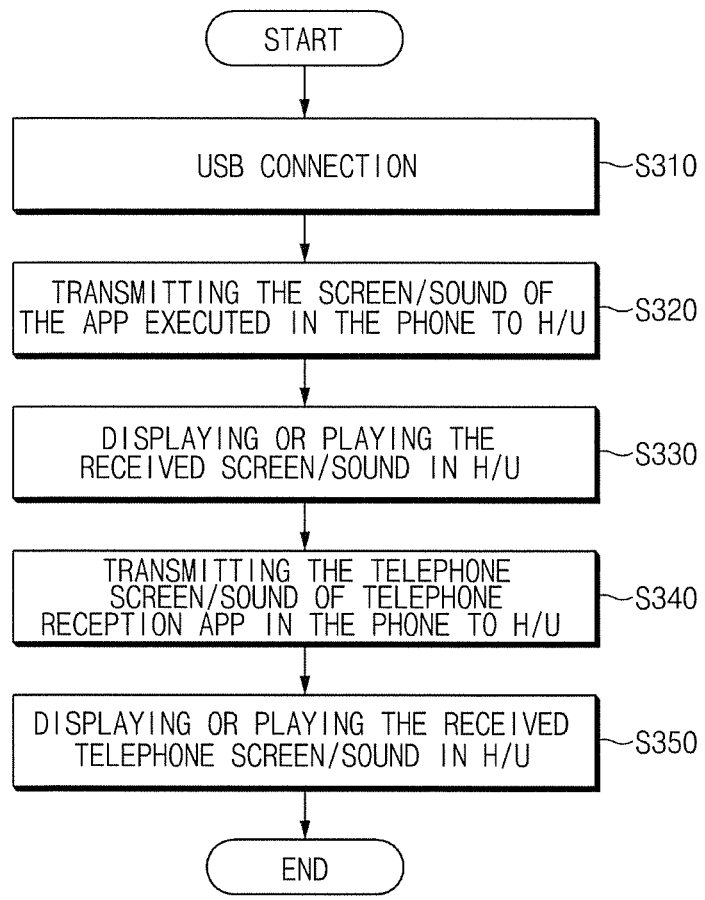
FIG. 3 is a diagram showing a process which a telephone call is performed in a two-way mirroring system for sound data according to an embodiment of the present inventive concept.

FIG. 3 is a diagram showing a process via which a telephone call is performed in a two-way mirroring system for sound data according to an embodiment of the present inventive concept.

First, the smart phone and the head unit are connected via a wired connection through USB for the mirror link (S310).

Then, one application (for example, APP1) of the various applications provided in the smart phone is executed, the screen image or sound of the executed APP1 is transmitted to the head unit through the connected USB (S320).

Then, the head unit displays or plays the received screen image or sound to the outside through the display or speaker provided in itself (S330).

In this state, when receiving a call or placing a call at the smartphone, the telephone APP provided in the smart phone is executed, and the telephone screen image or sound generated by the execution of the telephone APP is transmitted to the head unit (S340).

The head unit 100 displays or plays the received telephone screen image or sound to the outside instead of the screen image or sound displayed or played in step S320 (S350). Here, as the above described in FIG. 1, because the head unit 100 has the audio transmission server 103, it can transmit the telephone call sound inputted from the head unit 100 to the smart phone 200, and because the smart phone 200 includes the audio transmission client 203 receiving the sound transmitted from the audio transmission server 103, the two-way mirroring system for sound data can provide the telephone call service through the head unit 100 mirrored with the smart phone 200 without a separate connection via a Bluetooth communication. That is, the head unit 100 of the two-way mirroring system for sound data does not require a separate embedded telephone call application for a telephone call.

Figure 4:
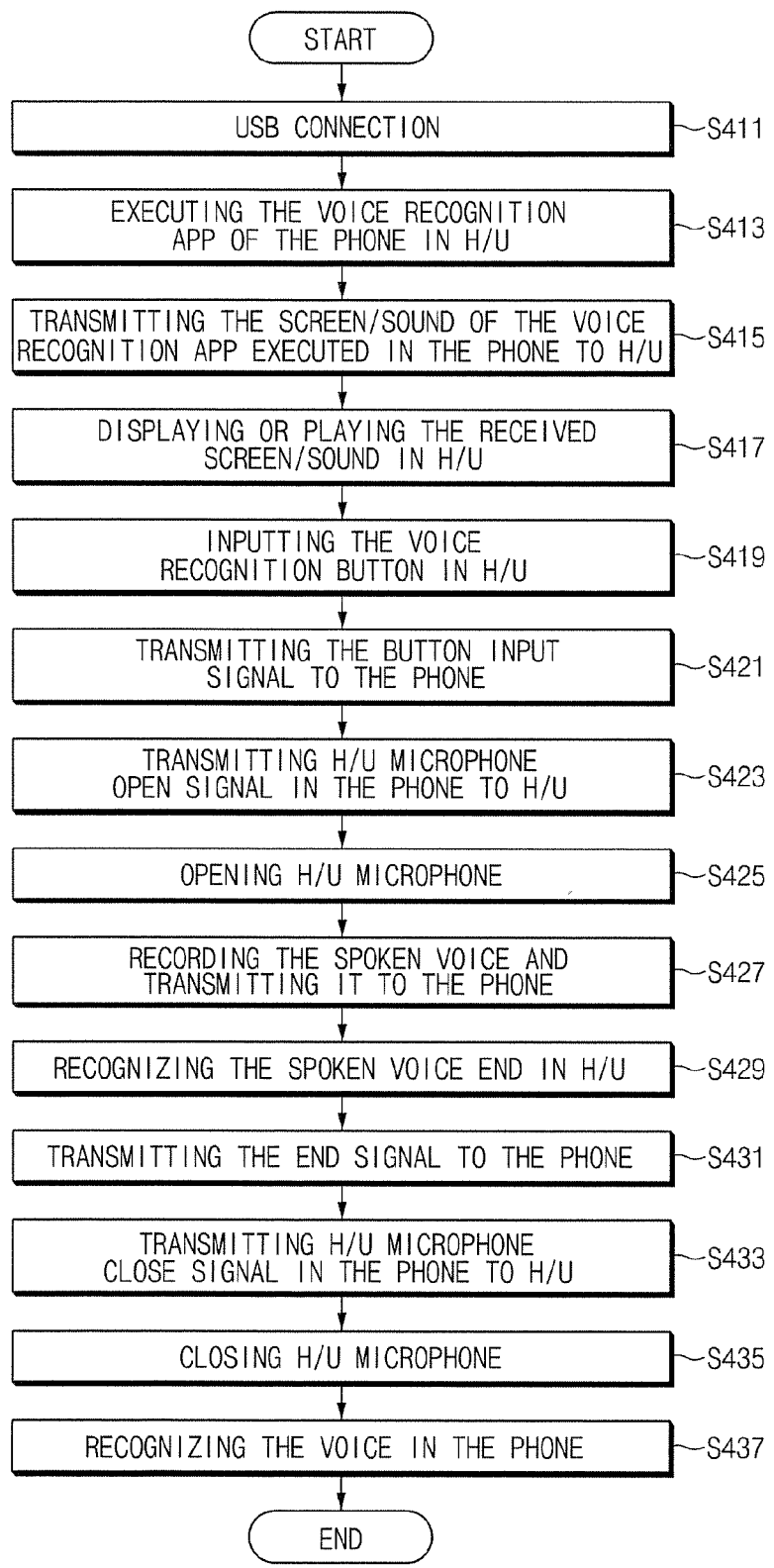
FIG. 4 is a diagram showing a process which a voice is recognized in a two-way mirroring system for sound data according to an embodiment of the present inventive concept.

FIG. 4 is a diagram showing a process via which a voice is recognized in a two-way mirroring system for sound data according to an embodiment of the present inventive concept.

First, the smart phone and the head unit are connected via a wired connection through the USE for the mirror link (S411).

Then, the voice recognition application (for example, a voice recognition APP) provided in the smart phone is executed (S413), the screen image or sound of the executed voice recognition APP is transmitted to the head unit 100 through the connected USB (S415).

Then, the head unit 100 displays or plays the received screen image or sound to the outside through the display or speaker provided in itself (S417).

Then, the voice recognition button provided in the head unit is inputted for receiving the voice spoken by the user (S419).

Then, the button input signal inputted in step S419 is transmitted to the smart phone 200 (S421).

Then, the voice recognition APP, executed in the smart phone 200 according to the button input signal transmitted in step S421, outputs the control signal for opening the microphone which is a voice input device provided in the head unit to the head unit (S423).

Then, the head unit opens the microphone according to the received control signal so that the voice can be recognized (S425).

Then, through the microphone opened in step S425, the head unit records the voice and transmits it to the smart phone (S427).

Then, the head unit recognizes that the speaking ends (429), and transmits the end signal notifying the end of the speaking to the smart phone (S431).

Then, according to the end signal transmitted in step S431, the voice recognition APP executed in the smart phone outputs the control signal for closing the microphone which is a voice input device provided in the head unit to the head unit (S433).

Then, the head unit closes the opened microphone according to the received control signal (S435), the voice recognition APP executed in the smart phone recognizes the voice of the recorded voice transmitted from the head unit in step S427 (S437).

Here, as described in FIG. 2, because the head unit 100 comprises the audio transmission server 103, the data transmission client 104 and the data transmission server 105, it can transmit the telephone call sound of the user inputted from the head unit 100 to the smart phone 200. This transmits the microphone control signal transmitted from the smart phone 200 to the voice input device 123, and transmits the end signal which indicates end of the voice input to the smart phone 200. And, because the smart phone 200 includes the audio transmission client 203, the data transmission server 204 and the data transmission client 205, it can receive the sound inputted from the head unit 100. This transmits the control signal which controls the voice input device 123 provided in the head unit 100 to the head unit 100, and receive the end signal indicating the end of speaking from the head unit 100.

After all, the two-way mirroring system for sound data according to the present inventive concept can provide the service recognizing the voice of the sound inputted through the head unit 100 mirrored with the smart phone 200 without a connection of a separate Bluetooth communication. That is, the head unit 100 of the two-way mirroring system for sound data does not require a separate embedded telephone call application for voice recognition, and can recognize the voice of the sound inputted from the head unit which is closer to the user.

In the above description, the present disclosure has been described through specific examples, but it may be well understood that various modifications can be made without departing from the scope of the present inventive concept. Therefore, the scope of the present inventive concept is not limited to the above described embodiments, and it should be defined by the appended claims and their equivalents. When taking the foregoing description into account, if the modifications and variations of the present inventive concept fall within the following claims and their equivalents, then it is construed that the present invention includes these modifications and variations.

What is claimed is:

1. A two-way mirroring system for sound data between a infotainment device provided in a vehicle and source device comprising:
    an infotainment device configured to display or play data including a video or sound; and
    a source device configured to be connected with the infotainment device and transmit the data to the infotainment device,
    wherein the infotainment device includes an audio transmission server which encodes the sound received from a sound input device and transmits the encoded sound to the source device, and
    wherein the source device includes an audio transmission client which receives the encoded sound transmitted from the audio transmission server and transmits the received encoded sound to an application provided inside the sound device,
    wherein the application provided inside the source device is a voice recognition application which recognizes the sound inputted to the sound input device, and
    wherein the source device comprises a first data transmission server configured to output a control signal for controlling open and close of the sound input device provided in the infotainment device to the display device.

2. The two-way mirroring system according to claim 1, wherein the source device is a mobile phone possessed by a passenger of the vehicle, the infotainment system and the mobile terminal are connected via a mirror link.

3. The two-way mirroring system according to claim 2, wherein the source device further comprises a communication device which receives and transmits a telephone call, and the application provided in the inside of the source device is a telephone call application which controls the communication device.

4. The two-way mirroring system according to claim 2, wherein the infotainment device and the source device are connected via a wired connection through Universal Serial Bus (USB).

5. The two-way mirroring system according to claim 1, wherein the source device comprises:
    a first data transmission client configured to receive an input end signal of the sound inputted from the infotainment device to the sound input device,
    the infotainment device further comprises:
    a second data transmission client configured to receive the control signal from the first data transmission server; and
    a second data transmission server configured to transmit the input end signal of the sound to the first data transmission client.

* * * * *